US012753275B2

(12) United States Patent
Kim

(10) Patent No.: US 12,753,275 B2
(45) Date of Patent: Oct. 6, 2026

(54) BIODEGRADABLE POLYESTER RESIN PREPARED BY ADDING REACTION RATE CONTROL AGENT AND MOLECULAR WEIGHT INCREASING AGENT DERIVED FROM BIOMASS AND METHOD FOR PREPARING SAME

(71) Applicant: BIOPLASTICS INNOVATIONS LIMITED, Hong Kong (CN)

(72) Inventor: Hyo Yeol Kim, Gangwon-do (KR)

(73) Assignee: Bioplastics Innovations Limited, Hong Kong (CN)

( * ) Notice: Subject to any disclaimer, the term of this patent is extended or adjusted under 35 U.S.C. 154(b) by 649 days.

(21) Appl. No.: 18/256,488

(22) PCT Filed: Nov. 12, 2021

(86) PCT No.: PCT/KR2021/016491

§ 371 (c)(1),
(2) Date: Jun. 8, 2023

(87) PCT Pub. No.: WO2022/124605

PCT Pub. Date: Jun. 16, 2022

(65) Prior Publication Data

US 2024/0026071 A1 Jan. 25, 2024

(30) Foreign Application Priority Data

Dec. 11, 2020 (KR) ........................ 10-2020-0173120

(51) Int. Cl.

| | |
|---|---|
| ***C08G 63/183*** | (2006.01) |
| ***C08G 63/127*** | (2006.01) |
| ***C08G 63/54*** | (2006.01) |
| ***C08G 63/86*** | (2006.01) |

(52) U.S. Cl.

CPC ......... *C08G 63/183* (2013.01); *C08G 63/127* (2013.01); *C08G 63/54* (2013.01); *C08G 63/866* (2013.01)

(58) Field of Classification Search

None

See application file for complete search history.

(56) References Cited

U.S. PATENT DOCUMENTS

| | | | |
|---|---|---|---|
| 4,094,721 A | 6/1978 | Sturm et al. | |
| 4,328,049 A | 5/1982 | Richardson | |
| 4,328,059 A | 5/1982 | Horlbeck et al. | |
| 2011/0020660 A1 | 1/2011 | Bastioli et al. | |
| 2013/0071588 A1 | 3/2013 | Bastioli et al. | |
| 2015/0158974 A1 | 6/2015 | Chun et al. | |
| 2015/0291733 A1 | 10/2015 | Hess et al. | |
| 2017/0129991 A1 | 5/2017 | Kim et al. | |
| 2018/0237583 A1 * | 8/2018 | Faiella ................ | C08G 63/183 |

FOREIGN PATENT DOCUMENTS

| | | | |
|---|---|---|---|
| CN | 102933635 A | 2/2013 | |
| CN | 104448281 A | 3/2015 | |
| CN | 104583270 A | 4/2015 | |
| CN | 104854162 A | 8/2015 | |
| CN | 106471037 A | 3/2017 | |
| EP | 0565235 A | 10/1993 | |
| KR | 10-0129794 B1 | 11/1997 | |
| KR | 97-0707206 A | 12/1997 | |
| KR | 10-0198045 B1 | 6/1999 | |
| KR | 10-0428687 B1 | 4/2004 | |
| KR | 10-2011-0008054 A | 1/2011 | |
| KR | 10-2012-0114507 A | 10/2012 | |
| KR | 10-1200824 B1 | 11/2012 | |
| KR | 10-2013-0118221 A | 10/2013 | |
| KR | 10-2015-0104081 A | 9/2015 | |
| WO | WO-2014019459 A1 * | 2/2014 | ........... C08G 63/181 |

OTHER PUBLICATIONS

Machine translation WO-2014019459-A1 (Year: NA).*
International Search Report and Written Opinion, mailed Feb. 28, 2022, from PCT/KR2021/016491.
Kolbuk, D. et al., "Poly(glycerol succinate) as an eco-friendly component to PLLA and PLCL fibres towards medical applications", Polymers 2020, Aug. 3, 2020, vol. 12, No. 8, 1731, pp. 1-17.

* cited by examiner

*Primary Examiner* — Rachel Kahn
(74) *Attorney, Agent, or Firm* — Workman Nydegger

(57) ABSTRACT

The present invention relates to: a biodegradable polyester resin prepared by adding a reaction rate control agent and a molecular weight increasing agent which are derived from biomass; and a method for preparing the same and, more specifically, to a biodegradable polyester resin and a method for preparing same, in which, to obtain a biodegradable polyester resin having a reaction rate, flexibility and tensile strength which are superior to those of polybutylene-co-adipate terephthalate, which is a conventional biodegradable polyester resin, polyglycerol succinate having a number average molecular weight of 500-1,000, prepared by synthesis through an esterification reaction between glycerol and succinic acid, is added as a reaction rate control agent derived from biomass to increase the reaction rate in the synthesis of a biodegradable polyester resin, and polyglycerol furanoate having a number average molecular weight of 1,000-5,000, prepared by synthesis through an esterification reaction between glycerol and 2,5-furandicarboxylic acid, is added as a molecular weight increasing agent derived from biomass to increase tensile strength, to thereby prepare a biodegradable polyester resin having a number average molecular weight of 70,000 or more, a weight average molecular weight of 150,000 or more, an acid value of 0.4-0.8 mg-KOH/g, and a tensile strength of 400 kgf/$cm^2$ or more.

9 Claims, No Drawings

BIODEGRADABLE POLYESTER RESIN PREPARED BY ADDING REACTION RATE CONTROL AGENT AND MOLECULAR WEIGHT INCREASING AGENT DERIVED FROM BIOMASS AND METHOD FOR PREPARING SAME

TECHNICAL FIELD

The present invention relates to: a biodegradable polyester resin prepared by adding a reaction rate control agent and a molecular weight increasing agent which are derived from biomass; and a method for preparing the same and, more specifically, to a biodegradable polyester resin and a method for preparing same, in which, to obtain a biodegradable polyester resin having a reaction rate, flexibility and tensile strength which are superior to those of polybutylene-co-adipate terephthalate, which is a conventional biodegradable polyester resin, polyglycerol succinate having a number average molecular weight of 500-1,000, prepared by synthesis through an esterification reaction between glycerol and succinic acid, is added as a reaction rate control agent derived from biomass to increase the reaction rate in the synthesis of a biodegradable polyester resin, and polyglycerol furanoate having a number average molecular weight of 1,000-5,000, prepared by synthesis through an esterification reaction between glycerol and 2,5-furandicarboxylic acid, is added as a molecular weight increasing agent derived from biomass to increase tensile strength, to thereby prepare a biodegradable polyester resin having a number average molecular weight of 70,000 or more, a weight average molecular weight of 150,000 or more, an acid value of 0.4-0.8 mg-KOH/g, and a tensile strength of 400 kgf/$cm^2$ or more.

BACKGROUND ART

As a living environment becomes prosperous, disposable plastics are gradually increasing. Disposable plastics used in this way cause serious environmental pollution when disposed of in the natural environment.

Accordingly, in order to solve these problems, many studies have been currently conducted worldwide to solve these serious environmental problems by manufacturing disposable products with biodegradable resins.

Biodegradable compositions have been known for decades. That is, an aromatic/aliphatic copolyester resin reacts with aromatic dicarboxylic acids such as terephthalic acid and dimethyl terephthalate, aliphatic dicarboxylic acids such as adipic acid, and glycols such as 1,4-butanediol to prepare polybutylene-co-adipate terephthalate, and the prepared polybutylene-co-adipate terephthalate has been currently produced worldwide by KINGFA, BASF, Novamont, Tunhe, Jinhui, S-EnPol, Xingfu and Soltech, and sold decades ago.

All these companies use almost constant contents of raw materials used and the same raw materials such as therephthalic acid, adipic acid, and 1,4-butanediol. However, the physical properties of all these companies are different from each other depending on process conditions for manufacturing polybutylene-co-adipate terephthalate.

When describing existing technologies related to biodegradable resins developed currently, in Korean Patent Registration No. 10-0129794 (Nov. 13, 1997), there is disclosed a method for obtaining an aliphatic polyester resin having a number average molecular weight of about 15,000 to in the presence of trihydric or higher polyhydric alcohol or trihydric or higher polyhydric carboxylic acid monomers as an auxiliary component of the reaction, and then obtaining an aliphatic polyester resin having a number average molecular weight of about 20,000 to 70,000 obtained by further reacting isocyanate as a coupling agent. According to this method, since the reaction time is long, the productivity is low and the use for a film is unsuitable, and isocyanate as a coupling agent used to increase the molecular weight, is extremely harmful to the human body, so that there is a problem in that work precautions are required.

In addition, in Korea Patent Registration 10-198045, it is not understood by those skilled in the art that a high acid value after condensation polymerization to prepare polybutylene-co-adipate terephthalate is lowered by solid-state polymerization, Chemical Formula obtained by reacting DL-malic acid with 1,4-cyclohexanedimethanol is also incorrect, unreacted 1,4-cycle hexanedimethanol remains, which slows down the reaction rate, and preparation of 4 steps through a reaction polycondensation compound with ester and solid-state polymerization is a problem in economic feasibility, and the effectiveness is in doubt in that the preparation is completed in two steps by other manufacturers. In addition, the acid value cannot be lowered by solid-state polymerization after condensation polymerization and the heat distortion temperature of polybutylene-co-adipate terephthalate is 70° C. to 80° C., but solid-state polymerization at 100° C. is impossible.

In addition, in Korean Patent Publication No. 1997-0707206, an aliphatic/aromatic copolyester copolymer was prepared by condensation polymerization using adipic acid and succinic acid as aliphatic dicarboxylic acid, terephthalic acid as aromatic dicarboxylic acid, dimethylterephthalate and 1,4-butanediol as aliphatic diol in a method of preparing aliphatic/aromatic copolyester. In order to increase the molecular weight, a trifunctional monomer, isocyanate, and sulfonate were added, but reaction time, gelation, and the like were concerned for this preparation, and even after this synthesis, a number average molecular weight (Mn) is about 1,000 to 5,000, so that the tensile strength and quality may be deteriorated.

Further, in Korean Patent Registration No. 10-428687 (Apr. 12, 2004), there is provided a method for preparing a biodegradable resin composition prepared by 3 to 65 parts by weight of polylactic acid with respect to 100 parts by weight of aliphatic polyester and aliphatic/aromatic copolyester through compounding using a twin-screw extruder. In this case, in the compounding process of polylactic acid (or its copolymer) and polybutylene succinate (or its copolymer), there is a problem that due to a high melting point of polylactic acid, the thermal stability of the prepared resin is significantly reduced when extruded at a high temperature, and the mechanical properties of the prepared resin are also reduced.

In addition, in U.S. Pat. No. 4,328,059 (May 4, 1982) and U.S. Pat. No. 4,094,721 (Jun. 13, 1980), polybutylene-co-adipate terephthalate was prepared using terephthalic acid as aromatic dicarboxylic acid, adipic acid as aliphatic dicarboxylic acid, and 1,4-butanediol as a glycol component as used raw materials.

Further, in Korean Patent Registration No. 10-1200824, an unsaturated compound and the like are used to prepare polybutylene coadipate, that is, an aromatic/aliphatic copolyester resin, which has a problem of gelation if the unsaturated compound and the like are not properly adjusted.

As such, existing biodegradable resins (polybutylene-co-adipate terephthalate) have been already known for decades and physical properties vary depending on who prepares polybutylene-co-adipate terephthalate with good physical properties in any method. However, existing methods have problems in spreading the uses due to poor tensile strength and transparency, and the like, and there are limitations in using the biodegradable resins due to poor workability and the like as compared with existing non-biodegradable resins.

Therefore, since the raw materials used in the preparation of polybutylene-co-adipate terephthalate, that is, aromatic/aliphatic copolyester, have been already known for decades, the key is to solve environmental pollution by manufacturing biodegradable disposable products that can be completely biodegraded by improving workability, transparency and tensile strength, which are problems of existing biodegradable resins, by using a third material to improve physical properties.

Accordingly, the present inventors developed a biodegradable polyester resin with an acid value of 0.4 to 0.8 mg-KOH/g, a number average molecular weight of 70,000 or more, and a tensile strength of 400 kgf/cm$^2$ or more using an aromatic/aliphatic copolyester biodegradable polyester resin with excellent reaction rate and tensile strength, and simultaneously maximized a production and solve the problems of biodegradability such as flexibility, tensile strength and durability by freely controlling the reaction rate, that is, the condensation polymerization time compared to existing biodegradable resins, and then completed the present invention.

DISCLOSURE

Technical Problem

An object of the present invention is to provide a biodegradable polyester resin with excellent flexibility and tensile strength that is completely degraded when disposed of in the natural environment and a method for preparing the same to protect the natural environment by solving the problems of reaction rate, tensile strength and durability, which are problems of the existing biodegradable polyester resins and solving the workability, which is a disadvantage of the existing biodegradable polyester resins.

Specifically, an object of the present invention is to a biodegradable polyester resin and a method for preparing the same, in which, to obtain a biodegradable polyester resin having a reaction rate, flexibility and tensile strength which are superior to those of polybutylene-co-adipate terephthalate, which is a conventional biodegradable polyester resin, polyglycerol succinate having a number average molecular weight of 500-1,000, prepared by synthesis through an esterification reaction between glycerol and succinic acid, is added as a reaction rate control agent derived from biomass to increase the reaction rate in the synthesis of a biodegradable polyester resin, and polyglycerol furanoate having a number average molecular weight of 1,000-5,000, prepared by synthesis through an esterification reaction between glycerol and 2,5-furandicarboxylic acid, is added as a molecular weight increasing agent derived from biomass to increase tensile strength, to thereby prepare a biodegradable polyester resin having a number average molecular weight of 70,000 or more, a weight average molecular weight of 150,000 or more, an acid value of 0.4-0.8 mg-KOH/g, and a tensile strength of 400 kgf/cm$^2$ or more.

Technical Solution

To solve the problem, the present invention provides a biodegradable polyester resin with excellent reaction rate, tensile strength, and durability and having an acid value of 0.4 to 0.8 mg-KOH/g, a number average molecular weight of 70,000 or more, a weight average molecular weight of 150,000 or more, and a tensile strength of 400 kgf/cm$^2$ or more.

More specifically, the present invention provides a method for preparing a biodegradable polyester resin having excellent flexibility and durability used in disposable products and plastic products made of biodegradable resins, wherein 1,4-butanediol may be used as a glycol component.

In addition, aliphatic (including cyclic aliphatic) dicarboxylic acid (or anhydride) includes succinic acid, glutaric acid, adipic acid, suberic acid, azelaic acid, sebacic acid, 1,9-nonanedicarboxylic acid, 1,10-decanedicarboxylic acid and their acid anhydrides, but these aliphatic (including cyclic aliphatic) dicarboxylic acids or their acid anhydrides may be used alone or as a mixture of two or more thereof.

As another preferable specific example, in an acid component used in a process of preparing an aliphatic/aromatic co-polyester polymer of the present invention, a weight ratio of aromatic dicarboxylic acid and aliphatic dicarboxylic acid is preferably 40:60 to 60:40, and at this time, in order to have biodegradability, if the aromatic content of the total acid component exceeds 55 wt %, it is not biodegradable, so that the attention is required.

Further, the technical solution is to add polyglycerol succinate with a number average molecular weight of 500 to 1,000 prepared by synthesis through an esterification reaction between glycerol and succinic acid derived from biomass, as a reaction rate control agent derived from biomass in the synthesis of the biodegradable polyester resin of the present invention.

That is, as the reaction rate control agent according to the present invention, the polyglycerol succinate is used by directly synthesizing polyglycerol succinate having a molecular weight of 500 to 1,000 as the following Reaction Formula 1 obtained by an esterification reaction and then condensation polymerization between glycerol and succinic acid derived from biomass.

[Reaction Formula 1]

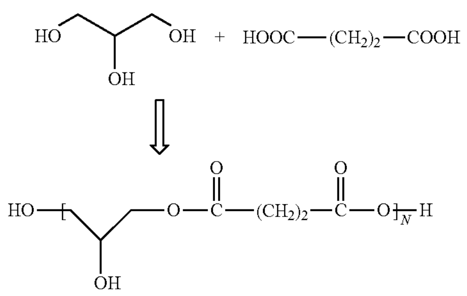

N is an integer and 2 to 5.

Further, the technical solution is to add polyglycerol furanoate having a number average molecular weight of 2,000 to 5,000 prepared by synthesizing glycerol and 2,5-furandicarboxylic acid derived from biomass as a molecular weight increasing agent derived from biomass in the synthesis of the biodegradable polyester resin to increase the tensile strength of the biodegradable polyester resin of the present invention.

That is, as the molecular weight increasing agent according to the present invention, the polyglycerol furanoate is used by directly synthesizing polyglycerol furanoate having a molecular weight of 2,000 to 5,000 as the following Reaction Formula 2 obtained by an esterification reaction and then condensation polymerization between glycerol and 2,5-furandicarboxylic acid derived from biomass.

[Reaction Formula 2]

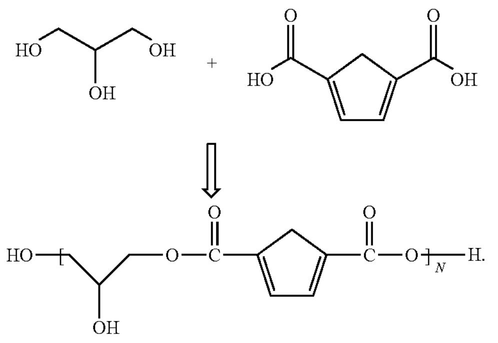

N is an integer and 8 to 20

In addition, as another preferred specific example, at the beginning or end of the esterification reaction, transesterification reaction and condensation polymerization reaction of the synthesis of the biodegradable polyester resin of the present invention, the catalyst to be added is used in the range of 0.01 to 0.8 wt % based on the total weight part of the reactant.

As a specific example of catalysts mentioned in already known [cited in Sax Toxi Substance Data Book Fujiyama, Maruzer.k.k 360s, EP-A 565,235] Roempo Chemie Lexikon Vol. 6, Thieme Verlag, Stuttgart, New York 9th Edition [1992, pages 4626-4633], the catalyst is preferably used with one or a mixture of two or more selected from the group consisting of tetrabutyl titanate, trioctyl antimony oxide, tin oxide, calcium acetate, zinc acetate, tetrapropyl titanate, etc.

As another preferred specific example, at the beginning or end of the esterification reaction, transesterification reaction and condensation polymerization reaction, the stabilizer is further added.

As stabilizers disclosed in already known EP-A No. 13,461 and U.S. Pat. No. 4,328,049, the stabilizer is used in the range of 0.02 to 0.1 wt % based on the total reaction and weight, wherein the stabilizer may be used with one or a mixture of two or more selected from phosphorous acid, trimethyl phosphate, and triphenyl phosphate.

In addition, it is good that the temperature range for performing a first esterification reaction and the transesterification reaction is maintained at 180 to 210° C., and it is suitable that the temperature for performing a second esterification reaction and the transesterification reaction is in the range of 230° C. to 240° C.

In addition, as another preferred specific example, it is preferable that a molar ratio of the acid component to the glycol to be added in the first and second esterification reactions is 1:1.15 to 1:1.5 mol.

In addition, as another preferred specific example, it is preferable that the condensation polymerization reaction is performed for 70 minutes to 110 minutes under a vacuum of 0.01 to 2.0 Torr in the temperature range of 230° C. to 240° C.

Advantageous Effects

According to the present invention, there are excellent effects of solving the disadvantages of existing biodegradable resins, such as reaction time, flexibility, and tensile strength, and protecting the natural environment by being completely decomposed when discarded in the natural environment by providing the biodegradable polyester resin prepared by adding a reaction rate control agent and a molecular weight increasing agent, which are derived from biomass, in which, to obtain a biodegradable polyester resin having a reaction rate, flexibility and tensile strength which are superior to those of polybutylene-co-adipate terephthalate, which is a conventional biodegradable polyester resin, polyglycerol succinate having a number average molecular weight of 500-1,000, prepared by synthesis through an esterification reaction between glycerol and succinic acid, is added as a reaction rate control agent derived from biomass to increase the reaction rate in the synthesis of a biodegradable polyester resin, and polyglycerol furanoate having a number average molecular weight of 1,000-5,000, prepared by synthesis through an esterification reaction between glycerol and 2,5-furandicarboxylic acid, is added as a molecular weight increasing agent derived from biomass to increase tensile strength, to thereby prepare a biodegradable polyester resin having a number average molecular weight of 70,000 or more, a weight average molecular weight of 150,000 or more, an acid value of 0.4-0.8 mg-KOH/g, and a tensile strength of 400 kgf/$cm^2$ or more.

MODES FOR THE INVENTION

A biodegradable polyester resin prepared by adding a reaction rate control agent and a molecular weight increasing agent which are derived from biomass is a biodegradable polyester resin with excellent reaction rate, tensile strength and durability and has an acid value of 0.4 to 0.8 mg-KOH/g, a number average molecular weight of 70,000 or more, a weight average molecular weight of 150,000 or more, and a tensile strength of 400 kgf/$cm^2$ or more.

In the present invention, as aromatic dicarboxylic acid, aromatic dicarboxylic acids (or acid anhydrides thereof) containing aromatics in a molecular structure such as terephthalic acid, dimethyl terephthalate, and isophthalate may be used, but it is preferable to use dimethyl terephthalate In addition, 1,4-butanediol may be used as a glycol component used in the biodegradable polyester resin of the present invention.

In addition, aliphatic (including cyclic aliphatic) dicarboxylic acid (or anhydride) includes succinic acid, glutaric acid, adipic acid, suberic acid, azelaic acid, sebacic acid, 1,9-nonanedicarboxylic acid, 1,10-decanedicarboxylic acid and their acid anhydrides, but these aliphatic (including cyclic aliphatic) dicarboxylic acids or their acid anhydrides may be used alone or as a mixture of two or more thereof.

Particularly, in an acid component used in a process of preparing an aliphatic/aromatic co-polyester polymer of the present invention, a weight ratio of aromatic dicarboxylic acid and aliphatic dicarboxylic acid is preferably 40:60 to 60:40, and at this time, in order to have biodegradability, if the aromatic content of the total acid component exceeds 55 wt %, it is not biodegradable, so that the attention is required.

Meanwhile, as the reaction rate control agent derived from the biomass of the present invention, polyglycerol succinate having a number average molecular weight of 500 to 1,000 is synthesized by performing an esterification reaction between glycerol and succinic acid derived from the biomass at 150 to 180° C. by adding a catalyst and a stabilizer, completely releasing water, gradually raising the temperature to 230° C., and then performing condensation polymerization under a high vacuum of 0.5 to 1 Torr for 5 minutes, according to Reaction Formula 1.

[Reaction Formula 1]

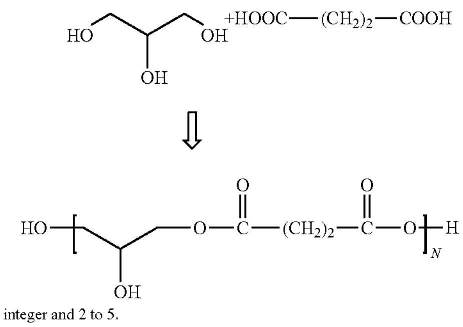

N is an integer and 2 to 5.

At this time, the condensation polymerization time is preferably 4 minutes to 10 minutes, and when the condensation polymerization time is less than 4 minutes, excessive glycol may remain, and when the condensation polymerization time is 10 minutes or more, there is a risk of gelation.

In addition, in order to increase the tensile strength of the biodegradable polyester resin of the present invention, as the molecular weight increasing agent derived from the biomass in the synthesis of the biodegradable polyester resin of the present invention, polyglycerol furanoate having a number average molecular weight of 2,000 to 5,000 is synthesized as shown in Reaction Formula 2 by performing an esterification reaction between glycerol and 2,5-furandicarboxylic acid derived from the biomass at 150 to 180° C. by adding a catalyst and a stabilizer, completely releasing water, gradually raising the temperature to 200° C., and then performing condensation polymerization under 0.5 to 1 Torr or less for 10 minutes.

[Reaction Formula 2]

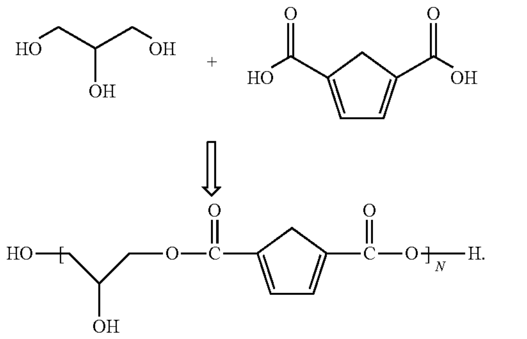

N is an integer and 8 to 20

At this time, when the esterification reaction temperature is 150° C. or less, it is difficult to release water, and when the esterification reaction temperature is 180° C. or more, deterioration may occur. In addition, the condensation polymerization reaction time is preferably 8 to 20 minutes. When the condensation polymerization reaction time is 8 minutes or less, the complete reaction may not proceed, and when the condensation polymerization reaction time is 20 minutes or more, there is a fear of gelation.

On the other hand, in the aliphatic/aromatic co-polyester biodegradable resin of the present invention, as a one-step synthesis method, an aromatic dicarboxylic acid component, glycol, a catalyst and a stabilizer are first added, and the temperature is gradually raised to 180° C. to 210° C., and a theoretical amount of methanol is completely released through a transesterification reaction and then the reaction is terminated, and thereafter, aliphatic dicarboxylic acid, the reaction rate control agent and the molecular weight increasing agent are added, the temperature is gradually raised to 230° C. to 240° C. again, and water is completely released through an esterification reaction and then the reaction is terminated. In this case, a weight ratio of the aromatic dicarboxylic acid and the aliphatic dicarboxylic acid in the total acid component is preferably 40:60 to 60:40.

In addition, as another one-step synthesis method, aliphatic dicarboxylic acid, glycol, a catalyst and a stabilizer are first added, and the temperature is gradually raised to 180° C. to 210° C., and a theoretical amount of water is completely released through an esterification reaction and then the reaction is terminated, and thereafter, aromatic dicarboxylic acid, the reaction rate control agent and the molecular weight increasing agent are added, the temperature is gradually raised to 230° C. to 240° C. again, and methanol is completely released through a transesterification reaction and then the reaction is terminated. At this time, the weight ratio of the aromatic dicarboxylic acid and the aliphatic dicarboxylic acid in the total acid component is preferably 40:60 to 60:40.

When the acid component of the aromatic dicarboxylic acid is more than 60 wt %, the biodegradability is significantly lowered, so that the biodegradable resin to be obtained in the present invention cannot be obtained. In addition, when the amount of aromatic dicarboxylic acid in the acid component is 40 wt % or less, heat resistance may also be deteriorated.

In the present invention, in preparing the aliphatic/aromatic copolyester resin, dicarboxylic acid and glycol is preferably added in a molar ratio of 1:1.15 to 1:1.5.

At this time, when the amount of glycol is 1.15 mol or less, there is a problem that the reaction rate may decrease and the color may deteriorate. In addition, when the amount of glycol is 1.5 mol or more, the manufacturing cost increases to reduce price competitiveness.

In addition, in the first-step synthesis, the esterification reaction or the transesterification reaction is performed by gradually raising the temperature to 180° C. to 210° C.

At this time, when the reaction temperature is 180° C. or less, it takes a lot of time to release the theoretical amount of water. In addition, when the reaction temperature is 210° C. or more, thermal decomposition may occur, resulting in a decrease in physical properties.

In this way, after the esterification reaction or transesterification reaction is terminated, the reaction temperature is gradually raised to start the condensation polymerization reaction, which is a second reaction. When the reaction temperature is 230° C. or less, the reaction rate slows down, and when the condensation polymerization temperature is 240° C. or more, there is a risk of thermal decomposition.

Meanwhile, in the present invention, the catalyst and the stabilizer are added at the beginning of the esterification reaction in the first and second steps, transesterification reaction or condensation polymerization reaction.

At this time, the addition amount of the catalyst is 0.01 to 0.8 wt % based on the total weight of the composition. At this time, if the amount of the catalyst used is less than 0.01 wt %, the esterification reaction and the transesterification reaction may not be performed smoothly, and as a result, the reaction time may be long and the color may be deteriorated during condensation polymerization.

In addition, when the catalyst amount exceeds 0.8 wt %, the reaction rate is fast, but the color and the molecular weight distribution are increased, which may cause the deterioration of physical properties.

In addition, it is preferred that the addition amount of the stabilizer is 0.02 to 0.1 wt %, and at this time, when the addition amount of the stabilizer is less than 0.02 wt %, a factor that significantly deteriorates the color may also occur, and when the addition amount of the stabilizer is greater than 0.1 wt %, the reaction rate is significantly reduced.

On the other hand, when the reaction rate control agent (polyglycerol succinate) derived from the biomass is added in an amount of less than 0.05 wt %, the production may be reduced, and there is a limit to shortening the condensation polymerization reaction time, and when the reaction rate control agent is added in excess of 0.5 wt %, the reaction rate is fast, but there is a high risk of gelation.

When the molecular weight increasing agent (polyglycerol furanoate) derived from the biomass is added in an amount of less than 0.03 wt % of the total component, there is a limit to increasing the molecular weight within the reaction time, and when added in an amount of more than 0.1 wt %, the molecular weight distribution may increase and the tensile strength may decrease.

When manufacturing a disposable product from the biodegradable polyester resin prepared as such, which has excellent reaction time (productivity), flexibility and tensile strength, it is possible to manufacture a product with high transparency and tensile strength.

Hereinafter, to help a more detailed understanding of the present invention, while the following Example 1 to Example 4 were performed as examples of the present invention, Example 5 to Example 7 were compared with Comparative Example 1 to Comparative Example 3, and comparatively tested as in Example 8, and then the results thereof were shown in Table 1.

Example 1

In a 500 ml round bottom flask, 0.45 mol of adipic acid and 1.3 mol of 1,4-butanediol were added and then added with 0.3 g of polyglycerol succinate as a reaction rate control agent and 0.036 g of tetrabutyl titanate as a catalyst when an internal temperature reached 80° C. while gradually raising the temperature, and an esterification reaction was performed while the temperature was gradually raised to 210° C. to completely release water. Thereafter, 0.55 mol of dimethyl terephthalate, 0.3 g of polyglycerol furanoate as a molecular weight increasing agent, and 0.06 g of tetrabutyl titanate as a catalyst were added, and a transesterification reaction was performed while raising the temperature to 200° C. again to release completely ethanol, and then 0.05 g of antimony trioxide as a catalyst and 0.02 g of trimethyl phosphate as a stabilizer were added, and then condensation polymerization was performed while gradually raising the temperature to 230° C. again.

From the copolyester resin obtained thus, a biodegradable copolyester resin was prepared with a condensation polymerization reaction time of 94 minutes, an acid value of 0.73 mg-KOH/g, a number average molecular weight of 782,000, a tensile strength of 472 Kgf/cm$^2$, and a weight average molecular weight of 153,000.

Example 2

In a 500 ml round bottom flask, 0.5 mol of dimethyl terephthalate, 1.35 mol of 1,4-butanediol, and 0.5 g of polyglycerol succinate were added and then added with 0.037 g of tetrabutyl titanate as a catalyst when an internal temperature reached 80° C. while gradually raising the temperature, and a transesterification reaction was performed while the temperature was gradually raised to 210° C. to completely release methanol. Thereafter, 0.5 mol of adipic acid and 0.04 g of tetrabutyl titanate as a catalyst were added, and an esterification reaction was performed while raising the temperature to 210° C. again to release completely water, and then 0.6 g of polyglycerol furanoate as a molecular weight increasing agent, 0.07 g of antimony trioxide as a catalyst and 0.021 g of trimethyl phosphate as a stabilizer were added, and then condensation polymerization was performed while gradually raising the temperature to 235° C.

From the copolyester resin obtained thus, a biodegradable copolyester resin was prepared with a condensation polymerization reaction time of 84 minutes, an acid value of 0.61 mg-KOH/g, a number average molecular weight of 82,000, a tensile strength of 510 Kgf/cm$^2$, and a weight average molecular weight of 171,000.

Example 3

In a 500 ml round bottom flask, 0.42 mol of adipic acid and 1.4 mol of 1,4-butanediol were added and then added with 0.7 g of polyglycerol succinate and 0.041 g of tetrabutyl titanate as a catalyst when an internal temperature reached 80° C. while gradually raising the temperature, and an esterification reaction was performed while the temperature was gradually raised to 210° C. to completely release methanol. Thereafter, 0.58 mol of dimethyl terephthalate, 0.6 g of polyglycerol furanoate, and 0.04 g of tetrabutyl titanate as a catalyst were added, and a transesterification reaction was performed while raising the temperature to 210° C. again to release completely water, and then 0.05 g of zinc oxide as a catalyst and 0.017 g of trimethyl phosphate as a stabilizer were added, and then condensation polymerization was performed while gradually raising the temperature to 235° C.

From the copolyester resin obtained thus, a biodegradable copolyester resin was prepared with a condensation polymerization reaction time of 74 minutes, an acid value of 0.51 mg-KOH/g, a number average molecular weight of 81,000, a tensile strength of 515 Kgf/cm$^2$, and a weight average molecular weight of 171,000.

Example 4

In a 500 ml round bottom flask, 0.49 mol of adipic acid, 1.45 mol of 1,4-butanediol and 0.45 g of polyglycerol succinate were added and then added with 0.032 g of tetrabutyl titanate as a catalyst when an internal temperature reached 80° C. while gradually raising the temperature, and an esterification reaction was performed while the temperature was gradually raised to 210° C. to completely release methanol. Thereafter, 0.51 mol of dimethyl terephthalate, 0.7 g of polyglycerol furanoate as a molecular weight increasing agent, and 0.033 g of tetrabutyl titanate as a catalyst were added, and the reaction was performed while raising the temperature to 210° C. again to release completely water, and then 0.032 g of antimony trioxide as a catalyst and 0.014 g of trimethyl phosphate as a stabilizer were added, and then condensation polymerization was performed while gradually raising the temperature to 235° C.

From the copolyester resin obtained thus, a biodegradable copolyester resin was prepared with a condensation polymerization reaction time of 93 minutes, an acid value of 0.79 mg-KOH/g, a number average molecular weight of 78,000, a tensile strength of 500 Kgf/cm$^2$, and a weight average molecular weight of 169,000.

Example 5

As Comparative Example 1, in a 500 ml round bottom flask, 0.45 mol of dimethyl terephthalate and 1.4 mol of 1,4-butanediol were added and then added with 0.052 g of tetrabutyl titanate as a catalyst when an internal temperature reached 80° C. while gradually raising the temperature, and a transesterification reaction was performed while the temperature was gradually raised to 210° C. to completely release methanol. Thereafter, 0.55 mol of adipic acid, 0.3 g of malic acid, and 0.038 g of tetrabutyl titanate as a catalyst were added, and an esterification reaction was performed while raising the temperature to 210° C. again to release completely water, and then 0.05 g of antimony trioxide as a catalyst and 0.019 g of trimethyl phosphate as a stabilizer were added, and then condensation polymerization was performed while gradually raising the temperature to 240° C.

From the copolyester resin obtained thus, a biodegradable copolyester resin was prepared with a condensation polymerization reaction time of 210 minutes, an acid value of 3.4 mg-KOH/g, a number average molecular weight of 41,000, a tensile strength of 330 Kgf/cm$^2$, and a weight average molecular weight of 98,000.

Example 6

As Comparative Example 2, in a 500 ml round bottom flask, 0.45 mol of dimethyl terephthalate, 1.3 mol of 1,4-butanediol, and 0.1 mol of ethylene glycol were added and then added with 0.052 g of tetrabutyl titanate as a catalyst when an internal temperature reached 80° C. while gradually raising the temperature, and a transesterification reaction was performed while the temperature was gradually raised to 210° C. to completely release methanol. Thereafter, 0.55 mol of adipic acid and 0.038 g of tetrabutyl titanate as a catalyst were added, and an esterification reaction was performed while raising the temperature to 210° C. again to release completely water, and then 0.05 g of antimony trioxide as a catalyst and 0.019 g of triphenyl phosphate as a stabilizer were added, and then condensation polymerization was performed while gradually raising the temperature to 235° C.

From the copolyester resin obtained thus, a biodegradable copolyester resin was prepared with a condensation polymerization reaction time of 220 minutes, an acid value of 3.8 mg-KOH/g, a number average molecular weight of 39,000, a tensile strength of 290 Kgf/cm$^2$, and a weight average molecular weight of 78,000.

Example 7

As Comparative Example 3, in a 500 ml round bottom flask, 0.55 mol of dimethyl terephthalate and 1.4 mol of 1.4-butanediol were added and then added with 0.052 g of tetrabutyl titanate as a catalyst when an internal temperature reached 80° C. while gradually raising the temperature, and a transesterification reaction was performed while the temperature was gradually raised to 210° C. to completely release methanol. 0.45 mol of adipic acid and 0.03 g of tetrabutyl titanate as a catalyst were added, and an esterification reaction was performed while raising the temperature to 210° C. again to release completely water, and then 0.05 g of antimony trioxide as a catalyst and 0.019 g of triphenyl phosphate as a stabilizer were added, and then condensation polymerization was performed while gradually raising the temperature to 240° C.

From the copolyester resin obtained thus, a biodegradable copolyester resin was prepared with a condensation polymerization reaction time of 270 minutes, an acid value of 3.7 mg-KOH/g, a number average molecular weight of 38,000, a tensile strength of 310 Kgf/cm$^2$, and a weight average molecular weight of 89,000.

Example 8

[Measurement of Physical Properties of Resin]

As in the following method, the physical properties of resins were measured and shown in Table 1.

[Method of Measuring Tensile Strength]

Tensile strength was measured by an ISO527 test method, and a 20-micro film specimen was prepared and measured at a rate of 500 mm/min per minute.

[Molecular Weight Measurement Method]

The molecular weight was measured by using polystyrene as a reference material and using a molecular weight measuring device, GPC.

[Acid Value Measurement Method]

1. Collect a sample (weighed).
2. Dissolve the sample in chloroform or methylenechloride.
3. Inject 2 to 3 drops of phenolphthalein when the sample was fully dissolved.

(Indicator preparing method–ethanol (90%)+phenolphthalein (10%)

4. Titrant of 0.1 N-KOH-ethanol

Molecular weight of KOH→56.11, 0.1 N→5.611 g

Add 6.60 g (5.611/0.85) of KOH to a 1 L mass flask, first dissolve about 20 ml of KOH with $H_2O$, and then dissolve KOH with ethanol up to a 1 L mark of water.

5. Gradually add the titrant of 4. above to the mixture of 3. above and measure the amount consumed until the color changes to red and is maintained for about 30 seconds.

TABLE 1

| | Example 1 | Example 2 | Example 3 | Example 4 | Comparative Example 1 | Comparative Example 2 | Comparative Example 3 |
|---|---|---|---|---|---|---|---|
| Dimethyl terephthalate (mol) | 0.55 | 0.5 | 0.58 | 0.51 | 0.45 | 0.45 | 0.55 |
| Adipic acid (mol) | 0.45 | 0.5 | 0.42 | 0.49 | 0.55 | 0.55 | 0.45 |
| Succinic acid (mol) | | | | | | | |

TABLE 1-continued

| | Example 1 | Example 2 | Example 3 | Example 4 | Comparative Example 1 | Comparative Example 2 | Comparative Example 3 |
|---|---|---|---|---|---|---|---|
| 1,4 butanediol (mol) | 1.3 | 1.35 | 1.4 | 1.45 | 1.4 | 1.3 | 1.4 |
| Ethylene glycol (mol) | | | | | | 0.1 | |
| Neopentyl glycol (mol) | | | | | | | |
| Polyglycerol succinate (g) | 0.3 | 0.5 | 0.7 | 0.45 | | | |
| Glycerol furanoate (g) | 0.3 | 0.65 | 0.6 | 0.7 | | | |
| Acid value (mg-KOH/g) | 0.73 | 0.61 | 0.51 | 0.79 | 3.4 | 3.8 | 3.7 |
| Weight average molecular weight (Mw) | 153,000 | 171,000 | 171,000 | 169,000 | 98,000 | 78,000 | 89,000 |
| Number average molecular weight (Mn) | 72,000 | 82,000 | 81,000 | 78,000 | 41,000 | 39,000 | 38,000 |
| Tensile strength ($kgf/cm^2$) | 472 | 510 | 515 | 500 | 330 | 290 | 310 |
| Reaction time (min) | 94 | 84 | 74 | 93 | 210 | 220 | 276 |

The above description just illustrates the technical spirit of the present invention and various changes and modifications can be made by those skilled in the art to which the present invention pertains without departing from an essential characteristic of the present invention. Therefore, the exemplary embodiments disclosed in the present disclosure are intended not to limit the technical spirit of the present disclosure but to describe the present disclosure and the scope of the technical spirit of the present disclosure is not limited by these exemplary embodiments. The protective scope of the present invention should be construed on the basis of the appended claims, and all the technical spirits in the equivalent scope thereof should be construed as falling within the scope of the present invention.

The invention claimed is:

1. A biodegradable polyester resin prepared by a method comprising an esterification reaction and a condensation polymerization reaction of:

dimethyl terephthalate and adipic acid in a weight ratio of 40:60 to 60:40 as an acid component, 1,4-butanediol as a glycol component, polyglycerol succinate as a reaction rate control agent, and polyglycerol furanoate as a molecular weight increasing agent, wherein the biodegradable polyester resin has:

a number average molecular weight of 70,000 or more, a weight average molecular weight of 150,000 or more, an acid value of 0.4 to 0.8 mg-KOH/g, and a tensile strength of 400 $kgf/cm^2$ or more.

2. The biodegradable polyester resin of claim 1, wherein a molar ratio of the acid component and the glycol component is 1:1.15 to 1:1.5.

3. The biodegradable polyester resin of claim 1, wherein the polyglycerol succinate as the reaction rate control agent is prepared by an esterification reaction and then condensation polymerization between glycerol and succinic acid derived from biomass according to the following Reaction Formula 1 to have a number average molecular weight of 500 to 1,000.

[Reaction Formula 1]

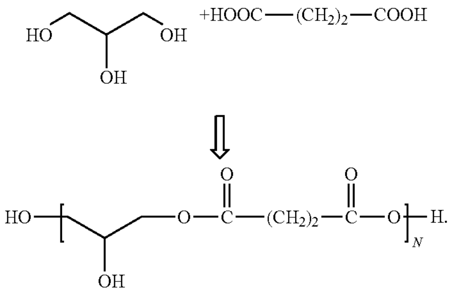

N is an integer and 2 to 5

4. The biodegradable polyester resin of claim 1, wherein the polyglycerol furanoate as the molecular weight increasing agent is prepared by an esterification reaction and then condensation polymerization between glycerol and 2,5-furandicarboxylic acid derived from biomass according to the following Reaction Formula 2 to have a number average molecular weight of 2,000 to 5,000.

[Reaction Formula 2]

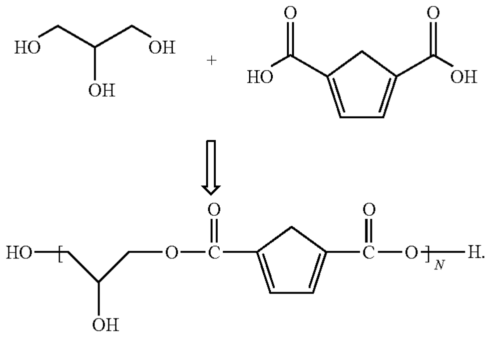

N is an integer and 8 to 20

5. The biodegradable polyester resin of claim 1, wherein a catalyst is added in a range of 0.01 to 0.8 wt % based on a total weight of the acid component, the glycol component, the reaction rate control agent and the molecular weight increasing agent.

6. The biodegradable polyester resin of claim 5, wherein the catalyst comprises at least one of tetrabutyl titanate, trioctyl antimony oxide, tin oxide, calcium acetate, zinc acetate, or tetrapropyl titanate.

7. The biodegradable polyester resin of claim 1, wherein a stabilizer is added in a range of 0.02 to 0.1 wt % based on a total weight of the acid component, the glycol component, the reaction rate control agent and the molecular weight increasing agent.

8. The biodegradable polyester resin of claim 7, wherein the stabilizer comprises at least one of phosphorous acid, trimethyl phosphate, and or triphenyl phosphate.

9. The biodegradable polyester resin of claim 1, wherein the esterification reaction is performed by a first esterification reaction at 180 to 210° C., and then a second esterification reaction at 230° C. to 240° C., and the condensation polymerization reaction is performed for 70 minutes to 110 minutes under a vacuum of 0.01 to 2.0 Torr in the temperature range of 230° C. to 240° C.

* * * * *